April 11, 1950     H. T. HODGES     2,503,736
SHUTTER ACTUATOR
Filed Sept. 8, 1948
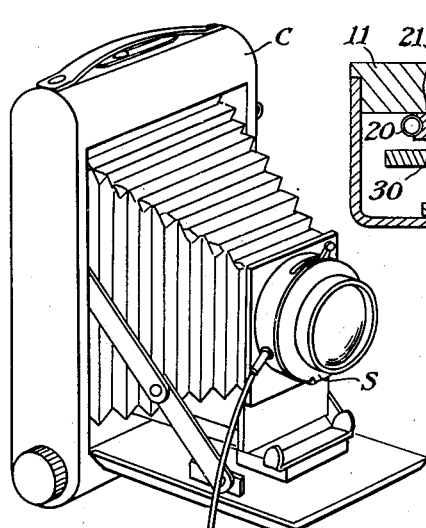
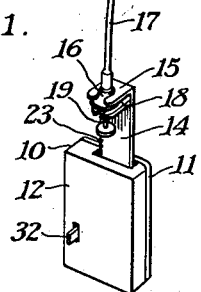
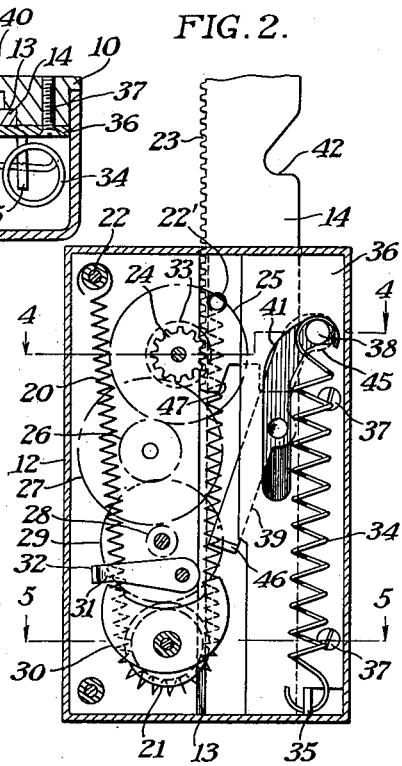
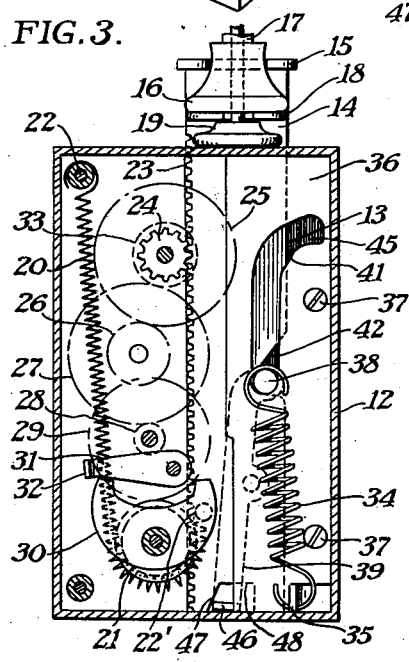
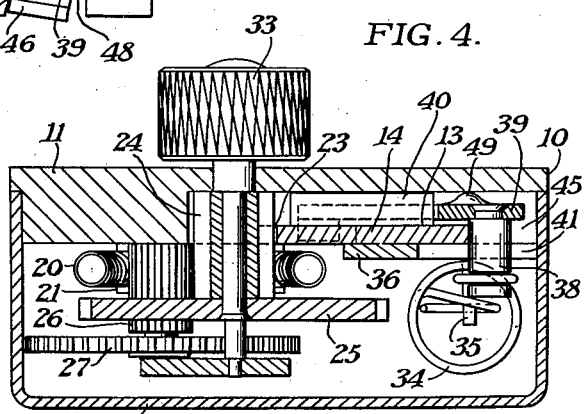
HOWARD T. HODGES
INVENTOR.
BY
ATTORNEYS Patented Apr. 11, 1950

2,503,736

UNITED STATES PATENT OFFICE 2,503,736

SHUTTER ACTUATOR

Howard T. Hodges, Rochester, N. Y., assignor to Eastman Kodak Company, Rochester, N. Y., a corporation of New Jersey Application September 8, 1948, Serial No. 48,211

5 Claims. (Cl. 161—26)

The present invention relates to a photographic accessory and particularly to a shutter actuator of the self-timer type which permits the photographer to get into the picture himself.

Many types of timing devices for actuating the cable release, or shutter trigger, of a photographic shutter, are already known. The primary feature of these shutter actuators is that the shutter of the camera is operated only after a predetermined interval and the photographer has an opportunity to enter the photographic field of the camera before the shutter is operated. Ordinarily, these shutter actuators work through cable releases which present a spring resistance, in addition to that of the trigger mechanism of the shutter itself. Accordingly, these actuators must be able to provide a considerable amount of power at the final portion of their stroke. This requires a spring force of considerable value and in conventional actuators of this type, where the retard mechanism has been required to work against this spring power throughout the entire stroke of the operating member, a rather large, cumbersome, and expensive retard mechanism has been required to obtain the necessary delay.

One object of the present invention is to provide a shutter actuator of the self-timer type which requires only a small and simple retard mechanism to obtain the desired delay, but which has sufficient power at the final portion of its operating stroke to operate a shutter-tripping mechanism involving the strongest spring resistance encounterable.

Another object is to provide a shutter actuator of the type set forth which includes a light spring to drive the retard mechanism and a booster spring which comes into play only at the end of the operating stroke of the shutter-operating motor to give the desired power for tripping the shutter and need not be opposed by the retard mechanism.

A further object is to provide a shutter actuator of the type set forth which is so designed that the booster spring is tensioned during cocking of the device but is automatically disconnected from the operating member some time before the cocking operation is complete, and is automatically reconnected to the operating member only just before it reaches the end of its operating stroke to be available for the final shutter-tripping operation.

And another object is to provide a shutter actuator of the type set forth which is compact, simple, and rugged in construction and can be suspended from the end of a cable release to operate the same.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 1 is a perspective view showing a photographic camera equipped with a cable release for tripping the shutter and showing a shutter actuator, constructed in accordance with a preferred embodiment of the present invention, mounted on the end of the cable release to actuate the shutter therethrough;

Fig. 2 is an enlarged vertical section of a preferred embodiment of my shutter actuator and showing the parts thereof in the position they assume when the device is cocked and ready for operation;

Fig. 3 is a view similar to Fig. 2 but showing the parts in the position they assume after the device has been released from its cocked position and has returned to its released position and has actuated the shutter;

Fig. 4 is a section taken substantially on line 4—4 of Fig. 2 but on an enlarged scale relative to Fig. 2;

Fig. 5 is a sectional view taken substantially on line 5—5 of Fig. 2; and

Fig. 6 is an enlarged detail showing how the end of the operating member of the device is formed to engage and operate the lever for positively connecting the booster spring to the operating member at some time after its release from the cocked position and before the final portion of the stroke thereof which produces the actual shutter-actuating force.

Like reference characters refer to corresponding parts throughout the drawings.

In general, the shutter actuator, in accordance with the present invention, comprises a spring-driven operating member which moves from a cocked position to a released position to cause the operation of a cable release or other shutter trigger mechanism to trip the shutter. The operating member works against a retard mechanism to obtain the desired delay. The operating member is normally under the influence of only a light spring during the first part of its operative movement so that the retard mechanism required is not too cumbersome and expensive. Near the end of its operating stroke, the operating member has a booster spring automatically connected thereto which adds to the light spring and provides the necessary power to accomplish the actual shutter-tripping function. The parts are so arranged that the booster spring is tensioned at the same time as the operating member is cocked and is disconnected therefrom sometime before the operating member reaches its full cocked position.

In the illustrated embodiment of the invention, the shutter acuator comprises a casing 10 composed of a back, or base plate 11 on which the mechanism is mounted, and which has a flange extending therearound on which a removable cover 12 is seated for enclosing the mechanism. Slidably mounted in a longitudinal groove 13 in the face of the base plate is an operating member 14, one end of which extends from the casing and is turned over and provided with a notch, as shown at 15, to slip over the collar 16 of a conventional cable release 17, see Figs. 1 and 3. The end of the operating member may also be provided with a second notched lug 18 in the form of a spring member to engage the other side of the collar on the cable release and thus, in cooperation with the notched, turned-over end 15 of the operating member, hold the casing 10 onto the end of the cable release. When the operating member 14 is in its extended or cocked position, see Figs. 1 and 2, the push rod 19 of the cable release is allowed to return to its inoperative position under the action of its own built-in spring, as is well known, and in which position the shutter "S" of the camera "C" is not tripped. When the operating member is moved to its retracted or released position, see Fig. 3, the push rod 19 of the cable release is compressed between the end of the casing 10 and its collar 16, and depressed to a shutter-tripping position.

The operating member 14 is normally moved to its retracted, or released, position by a light, coiled spring 20 passing around a pulley 21, rotatably mounted on the base plate 11 and having one end fixed to a pin 22 on the base plate, and the other end fixed to a pin 22' on the operating member. To retard the movement of the operating member 14 from its cocked position to its released position, one edge of the member is provided with gear teeth 23 which engage the pinion 24 rotatably mounted on the base plate and forming a part of a gear train retard mechanism. As shown, this gear retard includes gear 25 fixed to the shaft carrying pinion 24; this gear, in turn, engaging pinion 26 fixed to the same shaft as gear 27 to drive the same, and gear 27, in turn, driving a pinion 28 fixed to the same shaft as gear 29 to drive the latter. Gear 29 is then engaged by a pallet 30 oscillatably mounted on the same shaft as pulley 21. The gear retard mechanism is adapted to be locked by moving pivot lever 31 into engagement with the pallet to prevent it from oscillating. It is released by moving this lever from engagement with the pallet. The end 32 of the lever 31 is turned up and extends through a slot in the cover 12 to permit the same to be moved between its two positions by the finger, see Fig. 1.

The operating member is adapted to be moved to its extended, or cocked, position by turning a winding knob 33 fixed to one end of the shaft carrying the pinion 24 of the gear-retard mechanism. The coiled spring 20 is strong enough to move the operating member slowly against the retard mechanism and provide the necessary delay to allow the operator time to get into the picture before the exposure is actually made. To provide an additional force to the operating member near the end of its operating stroke for performing the actual work of tripping the shutter, I arrange a booster spring so as to be connected to the operating member to augment the coil spring 20. This booster spring and its associated structure will now be described.

Looking at Figs. 2 and 3, one end of a booster spring 34 is attached to a lug 35 extending upwardly from a cover plate 36 fixed to the base 11 by screws 37 in partial covering relation with the operating member 14. The other end of the booster spring is attached to a pin 38 fixed to the end of a lever 39. This lever is slidably mounted in a groove, or recess, 40 in the base of groove 13 in which the operating member 14 slides and is spaced below the member 14 so as to be free to move in its groove along with said operating member over a given portion of the stroke thereof and to move laterally relative to said operating member in the manner and for the purpose to be described hereinafter. The pin 38 extends upwardly through a slot 41 in the cover plate 36, said slot having a straight portion extending from one end longitudinally of the operating member and terminating in a curved portion, the end of which extends substantially laterally of the operating member.

This slot 41 controls the position of the pin 38 and hence the lever 39 to which it is fixed. The edge of the operating member 14 opposite the rack teeth is provided with a notch 42 into-and-out-of engagement with which the pin 38 is moved by following slot 41 to connect and disconnect the booster spring 34 to-and-from the operating member, respectively. When the operating member is in its retracted or released position, see Fig. 3, the pin 38 is in engagement with the straight edge of the notch 42 in the operating member 14 and lies at the end of the straight portion of the slot 41. Now when the operating member is moved to its cocked position by turning winding knob 33, the pin 38 is moved along with it, tensioning booster spring 34, until the pin reaches the curved portion of slot 41. At this point, which is only part-way to the full cocked position of the operating member 14, the curved portion of slot 41 cams the pin 38 out of the notch 42 and thus disconnects the booster spring 34 from the operating member. The operating member is then free to be moved on to its full cocked position independently of the booster spring and the booster spring is held in a tensioned position by being confined in the lateral or curved portion of slot 41 by the straight edge of the operating member, see Fig. 2. The edges of the grooves 13 and 40 in the base 11 are provided with a lateral cut-out portion 45 to allow the pin 38 and the end of lever 39 to move laterally of the operating member 14 to the position shown in Fig. 2.

When the pin 38 is moved to the position shown in Fig. 2, this causes the lever 39 carrying the same to pivot in its groove 40 whereupon the turned-up end 46 thereof is moved to the left and into the path of a cam portion 47 on the end of the operating member 14. Now when the gear retard mechanism is released by moving latch lever 31 away from the pallet 30, coiled spring 20 starts to drive the operating member from its cocked position downwardly; or, since the operating member 14 is attached to the end of the cable release, it starts to pull the casing upwardly, see Fig. 1. The spring 20 will continue to drive the operating member slowly until the notch 42 comes opposite the pin 38. At this instant, the cam portion 47 on the end of the operating member engages the turned-up end 46 of lever 39 and pivots the lever to move pin 38 into the notch 42 and thus positively connect the booster spring 34 to the operating member. From this point on, the booster spring augments spring 20 and sufficient power is available for the actual tripping of the shutter. In the fully released position of the operating member, the turned-up end 46 of the lever 39 lies in a notch 48 in the end of the member, one edge of said notch constituting the cam portion 47, see Fig. 6.

To facilitate the pivotal and sliding movement of the lever 39 in its groove 40, the lower face of the lever is provided with a rounded protuberance 49, see Fig. 4, which may be formed by striking the opposite face of the lever with a round-nosed punch.

While I have found it desirable to provide a means for positively returning the pin 38 to the notch 42 in the operating member during the release stroke thereof, it will be readily understood that the same result could be obtained by so locating the fixed end of the booster spring as to bias the pin 38 against the edge of the operating member at all times.

It is believed that from the above disclosure it will be obvious to one skilled in the art that I have provided a shutter actuator of the self-timer type which is simple and compact in construction, yet very efficient in operation. By my selective and timed use of a booster spring, I am able to obtain the necessary power for accomplishing the actual tripping operation of the shutter without having to build a retard mechanism large enough to restrain such power throughout the entire operation of the device. In other words, I obtain the desired time delay and the necessary final power by the use of a retard arrangement which would not give any appreciable delay if applied as in conventional devices of this type.

Although I have shown and described certain specific embodiments of my invention, I am aware that many modifications thereof are possible. My invention therefore is not to be limited to the precise details of construction shown and described, but is intended to cover all modifications coming within the scope of the appended claims.

Having thus described my invention, what I claim is new and desire to secure by Letters Patent of the United States is:

1. A shutter actuator of the type described comprising a casing, an operating member in said casing and movable from an inoperative position to an operative position in actuating the shutter, a retard mechanism operatively connected to said operating member for retarding the movement thereof, a first spring operatively connected with said operating member and normally acting to move it to its operative position, a booster spring adapted to act on said operating member to move it toward its operative position, means for cocking said operating member, and means for automatically disconnecting said booster spring from said operating member when it is moved to its inoperative position and for automatically connecting it to said operating member during the last portion of its movement toward its operative position.

2. A shutter actuator of the type described comprising a casing, an operating member mounted in said casing to move from a cocked position to a released position in actuating the shutter, a retard mechanism operatively connected to said member to retard the movement thereof from its cocked position, a first spring operatively connected to said member and normally acting to move it to its released position, means for cocking said operating member, a booster spring adapted to act on said operating member to assist said first spring in moving it to said released position, one end of said booster spring fixed to said casing, the other end of said spring connected to a pin movable with and relative to said operating member, means for releasably connecting said pin in driving engagement with said operating member, whereby movement of said member toward its cocked position will tension said booster spring and during a return movement of said member said booster spring will assist said first spring in moving said member to its operative position, means for disengaging said pin from driving engagement with said member at a given point in the stroke of said member to its cocked position before it reaches said cocked position, and means for reconnecting said pin to said member at some point in the return stroke of the member whereby the booster spring will assist said first spring in moving said member to its operative position.

3. A shutter actuator of the type described comprising a casing, a rack member mounted in said casing to move from a cocked position to a released position in actuating the shutter, a gear retard mechanism geared to said rack member to retard movement thereof from its cocked position, a first spring operatively connected to said rack member and normally acting to move it to its released position, a winding knob associated with one of the gears of said retard mechanism for cocking said rack member, a booster spring adapted to act on said rack member to assist said first spring in moving it to said released position, one end of said booster spring fixed to said casing, the other end of said booster spring connected with a pin mounted in said casing to move with and relative to said rack member, said rack member provided with a recess intermediate its ends into and out of positive engagement said pin is adapted to be moved, and means for shifting said pin out of engagement with said recess during the cocking movement of said rack member and after the booster spring has been cocked and for again shifting said pin into engagement with said recess during the movement of said rack member from its cocked and released position to connect said booster spring to said rack member for the final portion of its travel to its released position.

4. A shutter actuator according to claim 3 in which said last-mentioned means includes a stationary guideway in said casing and engaged by said pin, said guideway including a portion extending laterally of the path of movement of said rack member which forces said pin out of engagement with said recess in said rack member and holds the pin in a position to maintain the booster spring in a tensioned condition.

5. A shutter actuator according to claim 3 in which said last-mentioned means includes a stationary guideway in said casing and engaged by said pin, said guideway including a portion extending laterally of the path of movement of said rack member which forces said pin out of engagement with said recess in said rack member and holds the pin in a position to maintain the booster spring in a tensioned condition, said pin fixed to one end of a pivoted lever, and a lug on the end of said rack member adapted to engage the other end of said pivoted lever during the movement of said rack member to move said pin back into engagement with said recess in the rack member to connect the booster spring thereto.

HOWARD T. HODGES.

No references cited.